(12) United States Patent
Haveliwala (10) Patent No.: US 8,620,943 B2
(45) Date of Patent: *Dec. 31, 2013

(54) SYSTEM AND METHOD FOR MODULATING SEARCH RELEVANCY USING POINTER ACTIVITY MONITORING

(75) Inventor: Taher H. Haveliwala, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,017

(22) Filed: Mar. 31, 2010

(65) Prior Publication Data

US 2010/0191726 A1 Jul. 29, 2010

Related U.S. Application Data

(63) Continuation of application No. 11/059,794, filed on Feb. 16, 2005, now Pat. No. 7,756,887, which is a continuation of application No. 11/026,921, filed on Dec. 30, 2004, now abandoned.

(51) Int. Cl.
*G06F 17/30* (2006.01)

(52) U.S. Cl.
USPC .......................................... 707/769; 707/770

(58) Field of Classification Search
None
See application file for complete search history.

(56) References Cited

U.S. PATENT DOCUMENTS

| | | | |
|---|---|---|---|
| 6,285,999 B1 | 9/2001 | Page | 707/5 |
| 6,563,514 B1 * | 5/2003 | Samar | 715/711 |
| 7,100,123 B1 | 8/2006 | Todd et al. | 715/862 |
| 7,130,885 B2 | 10/2006 | Chandra et al. | 709/206 |
| 7,162,471 B1 | 1/2007 | Knight et al. | 707/3 |
| 7,243,130 B2 | 7/2007 | Horvitz et al. | 709/207 |
| 2001/0018685 A1 | 8/2001 | Saito et al. | 707/3 |
| 2002/0042923 A1 | 4/2002 | Asmussen et al. | 725/92 |
| 2004/0003042 A1* | 1/2004 | Horvitz et al. | 709/204 |
| 2004/0098462 A1 | 5/2004 | Horvitz et al. | 709/207 |
| 2004/0128356 A1 | 7/2004 | Bernstein et al. | 709/207 |
| 2004/0128359 A1 | 7/2004 | Horvitz et al. | 709/207 |
| 2004/0205514 A1* | 10/2004 | Sommerer et al. | 715/501.1 |
| 2004/0267723 A1 | 12/2004 | Bharat | 707/3 |
| 2005/0044224 A1 | 2/2005 | Jun et al. | 709/225 |
| 2005/0084082 A1 | 4/2005 | Horvitz et al. | 379/114.06 |
| 2005/0149498 A1* | 7/2005 | Lawrence et al. | 707/3 |

(Continued)

OTHER PUBLICATIONS

Rate Movies, downloaded from http://www.netflix.com/RateMovies on Apr. 12, 2004, 2 pages.

(Continued)

*Primary Examiner* — Shyue Jiunn Hwa
(74) *Attorney, Agent, or Firm* — Morgan, Lewis & Bockius LLP (57) ABSTRACT

A method and system of modulating search result relevancy use various types of user browsing activities. In particular, a client assistant residing in a client computer monitors movements of a user controlled pointer in a web browser, e.g., when the pointer moves into a predefined region and when it moves out of the predefined region. A server then determines a relevancy value between an informational item associated with the predefined region and a search query according to the pointer hover period. When preparing a new search result responsive to a search query, the server re-orders identified informational items in accordance with their respective relevancy values such that more relevant items appear before less relevant ones. The server also uses the relevancy values to determine and/or adjust the content of an one-box result associated with a search query.

21 Claims, 9 Drawing Sheets

(56) References Cited

U.S. PATENT DOCUMENTS

| | | | |
|---|---|---|---|
| 2005/0182773 A1* | 8/2005 | Feinsmith | 707/100 |
| 2005/0210008 A1* | 9/2005 | Tran et al. | 707/3 |
| 2005/0223067 A1 | 10/2005 | Buchheit et al. | 709/206 |
| 2005/0289133 A1* | 12/2005 | Arrouye et al. | 707/4 |
| 2006/0031183 A1* | 2/2006 | Oral et al. | 707/1 |
| 2006/0031253 A1 | 2/2006 | Newbold et al. | 707/104.1 |
| 2006/0041521 A1* | 2/2006 | Oral et al. | 707/1 |
| 2006/0047804 A1* | 3/2006 | Fredricksen et al. | 709/224 |
| 2006/0074984 A1* | 4/2006 | Milener et al. | 707/104.1 |
| 2008/0201315 A1* | 8/2008 | Lazier et al. | 707/5 |

OTHER PUBLICATIONS

Netflix Source Code, associated with http://www.netflix.com/RateMovies, downloaded over the Internet on Apr. 12, 2004, 10 pages.

Google News, messages 1-15, downloaded from http://www.webmasterworld.com/forum3/18425.htm on Nov. 20, 2003, 5 pages.

Google News, messages 16-20 downloaded from http://www.webmasterworld.com/forum3/18425-2-15.htm on Nov. 20, 2003, 3 pages.

XML-RPC JavaScript Message Builder, downloaded from http://www.scottandrew.com/xml-rcp/ on Apr. 6, 2004, 6 pages.

\* cited by examiner

SYSTEM AND METHOD FOR MODULATING SEARCH RELEVANCY USING POINTER ACTIVITY MONITORING

This application is a continuation of U.S. patent application Ser. No. 11/059,794, filed Feb. 16, 2005, now U.S. Pat. No. 7,756,887 which is a continuation of U.S. patent application Ser. No. 11/026,921, filed Dec. 30, 2004, now abandoned which is incorporated by reference herein in its entirety

FIELD OF THE INVENTION

The present invention relates generally to the field of search engines, and in particular, to a system and method of modulating a search result relevancy with user feedback.

BACKGROUND OF THE INVENTION

A typical use of a search engine involves a user, a search query and a client device. The user submits the search query through the client device to the search engine. Upon receipt of the search query, the search engine identifies in its database one or more items relevant to the search query according to a set of predefined criteria, and returns the identified items to the client device as a search result (e.g., documents, advertisements and/or units of information such as dictionary definitions). The items are ordered based upon their respective relevancy or ranking values according to a predefined empirical standard (e.g., PageRank, as described in detail in U.S. Pat. No. 6,285,999, hereby incorporated by reference in its entirety). An item with a higher ranking value usually appears before those of lower ones.

The click through rate of an informational item may be defined as the ratio of the number of times the item has been selected by a user (sometimes called the number of click throughs) to the number of times the item was displayed (sometimes called the number of impressions), and thereby made available for selection. In at least one widely used system, advertisements corresponding to displayed content are ordered in accordance with a ordering function, one parameter of which is the click through rates of the items (advertisements) being ordered.

In at least some situations, when displaying a set of informational items, informational items having high click through rates should be ranked higher, and displayed more prominently than informational items with lower click through rates, because the items with high click through rates are more likely to be of interest to the user(s).

However, if the information being sought, e.g., the meaning of a word, is already available from an informational item as presented in the search results (i.e., not requiring the user to click though to receive additional information), the search engine may not receive user feedback about the relevancy of the informational item to the search. The user has little motivation to provide feedback such as a click through because the user now has the information sought, or there may be no outbound link associated with the information item. Therefore, there is a need for collecting user feedback with respect to informational items presented in response to a search query and adjusting the relevancy values of the items in accordance with the user feedback, even if there is no click through information about one or more of the informational items.

SUMMARY

According to some embodiments, one or more informational items are displayed in response to a search query. Each item occupies a respective region on a display and has a relevancy value associated with the search query. The user's browsing (e.g., pointer placement and/or movement) activities are monitored with respect to the displayed informational items. At least one informational item's relevancy value is adjusted in accordance with the user's browsing activities with respect to the item's respective region.

BRIEF DESCRIPTION OF THE DRAWINGS

The aforementioned aspects of the invention as well as additional aspects will be more clearly understood as a result of the following detailed description of the various embodiments of the invention when taken in conjunction with the drawings. Like reference numerals refer to corresponding parts throughout the several views of the drawings.

DESCRIPTION OF EMBODIMENTS

Overview

Figure 1:
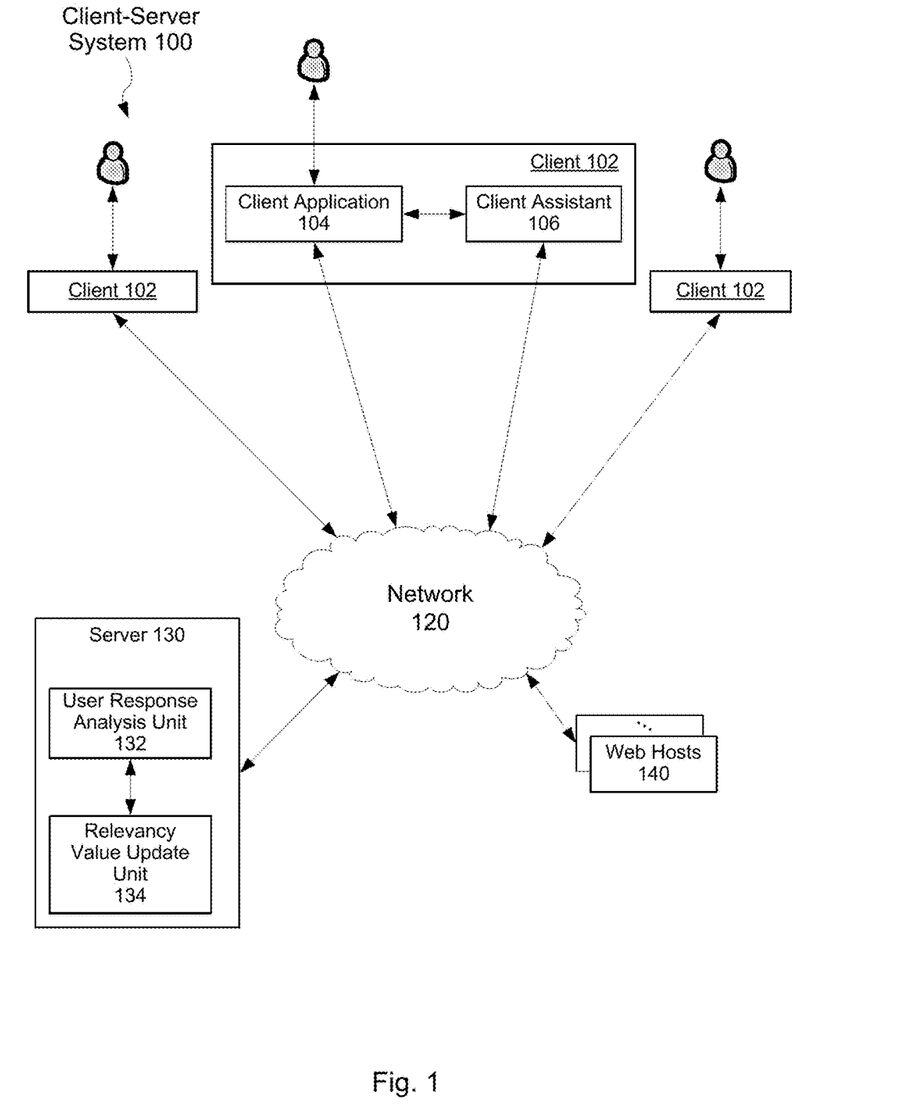
FIG. 1 is a block diagram illustrating a client-server network system according to some embodiments of the present invention.

FIG. 1 is a block diagram illustrating a client-server network system 100. The system 100 includes a plurality of clients 102 that are connected to a server 130 and to a plurality of web hosts 140 through a network 120. The network 120 may include the Internet, other wide area networks, local area networks, metropolitan area networks, wireless networks, etc. In one embodiment, the server 130 is a search engine that includes information about millions or even billions of documents stored at various web hosts 140. When the search engine receives a search query from one of the clients 102, it identifies a set of informational items, including, in most instances, a link to a document that is relevant to the search query, and returns them to the requesting client as a search result. The search engine may also return other types of information items such as advertisements, dictionary definitions, images, audio files, or other units of information which may or may not includes links to more information associated with the returned information item. In some instances the informational item contains enough information such that a link may not be desirable or necessary. For example, if a definition for a word was returned as an informational unit it is may satisfy a user's interest without the need for additional information.

In some embodiments, a client (also sometimes called a client device) 102 hosts a client application 104 and a client assistant 106. The client 102 may be a personal digital assistant (PDA), a personal computer (PC) or a workstation that can display the informational items within a search result, and the client application 104 can be a web browser or a standalone program that sends requests to and receives information from a database or a search engine. The client application 104 is used for displaying search results received from the search engine and the client assistant 106 is responsible for monitoring user browsing activities in connection with the search results and providing such information back to the search engine. In the context of this document, the term "monitoring user browsing activities" means monitoring a user's pointer activities (e.g., pointer placement and movement).

In some embodiments, the client application 104 is a browser (e.g., Firefox, Safari, Internet Explorer or others). In some embodiments, the server 130 includes a user response analysis unit 132 for receiving and analyzing user browsing activities (i.e., pointer activity, such as placement and movement) and a relevancy value update unit 134 for updating an informational item's relevancy value associated with a search query based on information received from the user response analysis unit 132. As a result, subsequent responses by the search engine to the same query or a similar search query from any client, may identify a new set of informational items and/or provide them in a different order in accordance with their updated relevancy values. While the explanations provided here use the term "relevancy value," other terms such as "ranking value" or "query dependent ranking value" may also be used. The relevancy value of an informational item may be used for ordering or ranking results responsive to a search query or other query that produces a plurality of results.

Because an informational item's relevancy value associated with a search query is generally an aggregation of feedback regarding the item received from a community of users, it can serve to characterize the community's opinion about the relevancy between the informational item and the search query, or an underlying document associated with the informational item. An item found to be more relevant to a search query (or perhaps more accurately, found to be of more interest to the users who submit the search query), should be placed in a position to match its popularity among the community (e.g., being moved to a more prominent position in the display presented to the user). In some embodiments, the community is a set of users sharing at least one similar characteristic such as belonging to the same workgroup, using the same language, using the same type of client device, having an internet address associated with the same country or geographic region, or the like. Different communities would tend to produce different user feedback. Over time, an item receiving positive user feedback will tend to move to more prominent positions in the results and, conversely in some embodiments, an item receiving no feedback or negative feedback should move to lesser positions (e.g., downward) in the search result. In some embodiments, the relevancy value of an informational item is query-dependent and the same item may have different relevancy values associated with different search queries. In some embodiments, the relevancy value of an informational item will be a dynamic parameter since the community's opinion about the relevance between the informational item and a search query may vary with time. For example, as the popularity, frame or notoriety of a movie star, musician or politician rises and falls, the relevancy values of informational items about that person will similarly rise and fall.

Process and Example

There are many types of user browsing activities that may indicate a user's interest in an informational item responsive to a search query. For example, if after reviewing a snippet of a document associated with the informational item, the user determines that the underlying document may contains relevant information, the user may click through an embedded link to visit a complete version of the document. A typical user's behavior is to move the mouse pointer (or any other pointing indicator) over or near a target informational item, keep the mouse pointer there for a period of time while the user reads the item's information (e.g., title and snippet), and then click through the underlying link or move to another item. Sometimes, a user may review multiple informational items responsive to a search query, moving a pointer over or near each of the informational items that the user reviews. These various pointer activities can provide another way to evaluate the user's feedback with respect to a particular informational item. A longer pointer hover period may suggest a more positive opinion from the user about the relevance between the informational item and the user's interest. Sometimes, a particular pointer movement pattern may provide additional information about a user's interest. For example, a user moving the pointer across the snippet line by line at a normal reading speed suggests a higher level of attention that the user paid to the informational item than if the pointer had been kept in a static position or moved randomly. An informational item that is associated with a click-through may be more relevant to a search query than another item that receives user attention, such as pointer hover time greater than a threshold value, but no mouse-down action.

In some embodiments, the client assistant 106 shown in FIG. 1 is primarily responsible for gathering information about various user browsing activities and the server 130 is primarily responsible for analyzing the information collected by the client assistant 106 and updating relevancy values of informational items accordingly. In other embodiments, the distinction is less clear and the client assistant 106 and the server 130 may have varying degrees of responsibility. In embodiments where the client assistant 106 assumes a substantial amount of workload (e.g., conducting preliminary relevancy analysis and selecting one type of user browsing activity over another one), the client assistant 106 is referred to as a thick-client. In embodiments where the client assistant 106 does little analysis and passes substantially all information about a user's browsing activities to the server, the client assistant 106 is referred to as a thin-client. Any flavor of the client assistant 106, (i.e., thick-client, thin-client or something in between), may be implemented using executable code such as JavaScript which may be included in the page of search results, as a plug-in application program attached to the client application 104 (e.g., a toolbar), or a stand-alone application.

Figure 2A:
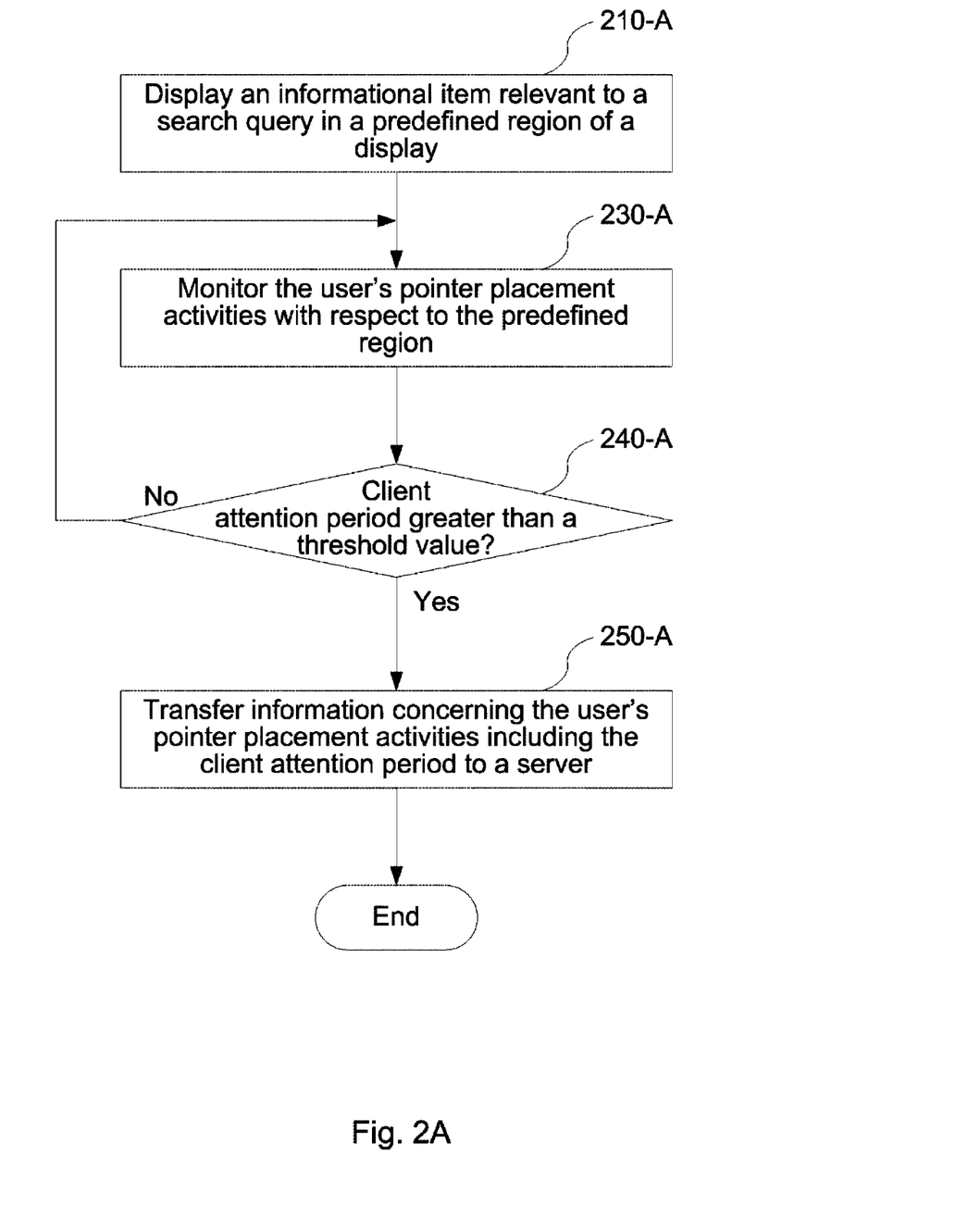
FIG. 2A is a schematic flowchart illustrating an exemplary thick-client embodiment of a client assistant.

FIG. 2A is a schematic flowchart illustrating a thick-client embodiment of a client assistant 106. This embodiment, and its thin-client counterpart described with reference to FIG. 2B below, may be used for monitoring the user's pointing activities, e.g., the location where buttons are pressed, the movement pattern of the pointer and the speed of the pointer, etc. In response to a search query, one or more informational items are presented in a display by the client application 104 to a requesting user (210-A). These informational items may be part of a search result or a keyword-triggered advertising item.

In some embodiments, the client assistant 106 monitors a predefined region of the display that is associated with the informational item, and the user's pointer placement activities with respect to that predefined region (230-A). For example, the client assistant 106 identifies when the user moves the pointer into the predefined region and when the user moves the pointer out of the predefined region. Based on these two identifications, the client assistant determines a continuous hover period or client attention period. In some embodiments, the client assistant 106 then determines whether this client attention period is greater than a threshold value (240-A).

If the client attention period is greater than the threshold value (240-A, yes), the client assistant 106 sends the information associated with the user's pointer placement activity including the client attention period to a server (250-A) for further processing. Otherwise (240-A, no), the client assistant 106 does not send the information it has gathered and returns to monitoring pointer movements. Since a search result often includes many informational items and the pointer often temporarily passes through many regions associated with different items on its way to the target item, these brief hovers are usually too short to reflect any genuine user interest in the underlying informational items. Skipping these items by appropriately setting the threshold value also reduces the server-side workload, since less information about the user's mouse activities is sent over to the server side for further processing.

Figure 2B:
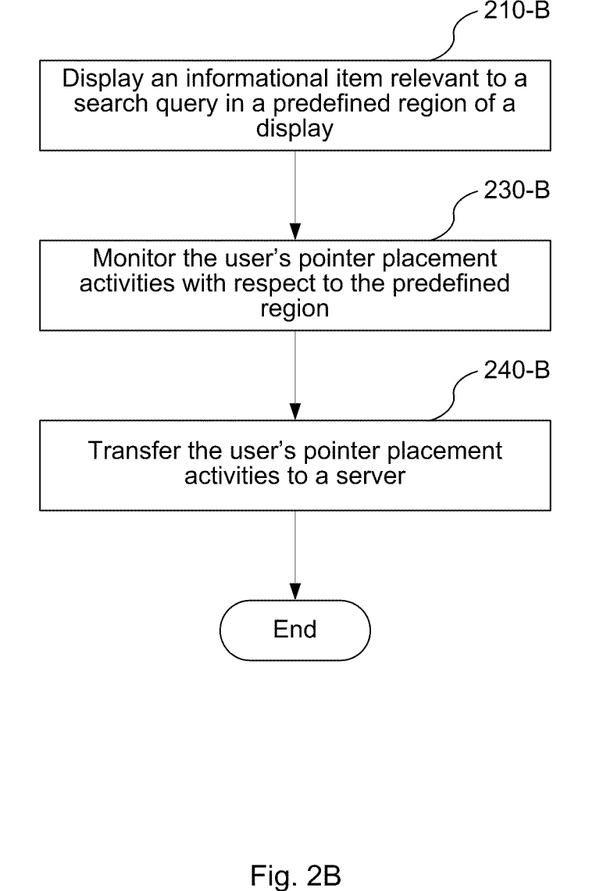
FIG. 2B is a schematic flowchart illustrating an exemplary thin-client embodiment of a client assistant.

FIG. 2B is a schematic flowchart illustrating a thin-client embodiment of the client assistant. This embodiment is "thinner" than the previous embodiment because the client assistant in this embodiment does not calculate the client attention period. As mentioned earlier, in some embodiments, however, the division of the workload between the client and server is allocated differently. In some of these embodiments, the client assistant 106 displays one or more informational items in a display (210-B), monitors a user's pointer placement activities (230-B) and transfers information about the user's pointer placement activities to a server for further analysis (240-B), letting the server determine whether or not a particular activity, e.g., a pointer indicator movement, may reflect the user's interest in the displayed informational item.

In some embodiments, the information about a user's pointer placement activities that is transferred back to a server may be used to modify the information currently being presented to the user. For instance, when a user hovers a pointer over a definition in a onebox, and information about the pointer hover is conveyed to the server, the server may send a more complete definition to the client for immediate display. In one exemplary implementation, the additional information is displayed in a pop-up window. In yet other embodiments, the additional information is conveyed to the client by the server with the initial web page or search results, or is otherwise conveyed before the user pointer hover over the item has been determined, and in these embodiments the additional information is displayed by the client system (without further assistance from the server) when the user's pointer hover activity meets predefined criteria, such as hovering more than a threshold period of time.

As mentioned above, a user's feedback with respect to an informational item may appear in many forms of user pointer placements or actions, sometimes called user browsing activities. It will be understood by one skilled in the art that the client assistant can track other types of mouse or pointer actions, e.g., when and where the mouse button is pressed down, how long the mouse pointer is over the title of the informational item or how long it is within the snippet of the informational item. In some embodiments, mouse or pointer hovering over different sections of an informational item carry different weights in determining its relevancy value. For example, hover time over a first portion (e.g., a snippet portion) of an informational item may be assigned a first weight W1, while hover time over a second portion (e.g., a descriptor, such as a title portion) of the informational item may be assigned a distinct, second weight W2. In the present invention, such information including the pointer hover period is commonly referred to as "client attention data" that is used by the server when determining the relevancy value of the informational item associated with the search query. Further, the techniques described herein are not limited to the use of a mouse pointing device. Rather, the techniques and embodiments disclosed herein apply equally well to any type of device which tends to indicate a user's pointing to regions of the display (e.g., tablets, touch-screens, eye movement detectors, light pens and so on).

The relevancy value of an informational item associated with user pointer activities can be a statistical parameter that becomes increasingly more reliable as the server accumulates increasing amounts of client attention data. In some embodiments, the server is responsible for updating an informational item's relevancy value according to a predetermined schedule, e.g., every day or every week, using its associated client attention data and impression data, as well as query-independent information such as PageRank. In other embodiments, an informational item's relevancy value is updated or recomputed at query time, while computing the rankings or orderings of the information items included in the results for a search query.

Figure 3:
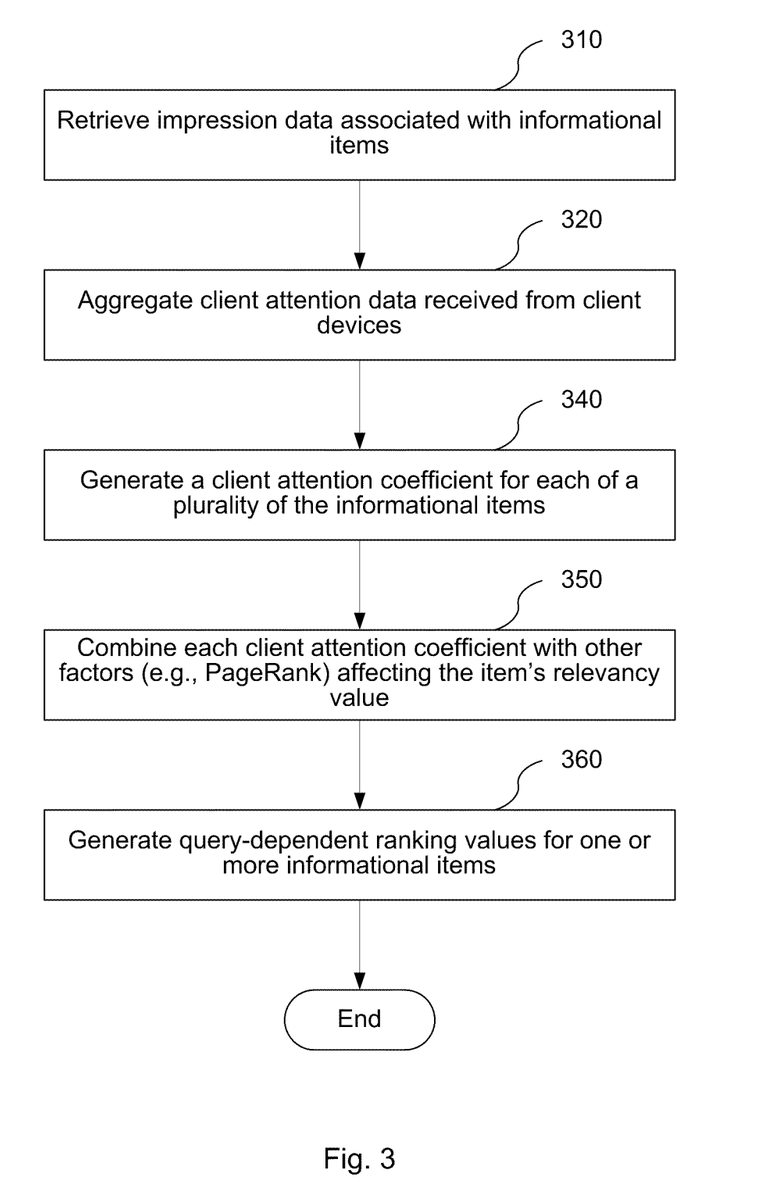
FIG. 3 is a flowchart illustrating how adjustments are made to informational items' relevancy values according to some embodiments of the present invention.

FIG. 3 is a flowchart illustrating how adjustments are made to the relevancy values for informational items according to some embodiments of the present invention. These adjustments may be executed at regular time intervals on the server-side (e.g., including, but not limited to, every day), or triggered whenever the server has accumulated a predefined amount of client attention data). The server may first retrieve impression data associated with the informational items that are provided to client devices in response to search queries (310). In some embodiments, the impression data includes data indicating how many times and in what orders the informational items are provided to the client devices in response to the search queries.

Next, the server aggregates client attention data that is received from the client devices over a predefined time period (320) and generates a client attention coefficient for each of a plurality of informational items by analyzing the impression data and client attention data (340). For each informational item for which sufficient client attention data has been collected to generate a new or revised relevancy value, the server combines the client attention coefficients associated with the informational item with their respective query-independent metrics, e.g., PageRank, indicating the informational item's importance or popularity (350) and generates a new relevancy value or updates an existing one for each informational item (360). In other words, in some embodiments, the relevancy value of an informational item includes both query-dependent components, e.g., client attention data, and query-independent ones, e.g., PageRank. In some embodiments, the client attention data and query-independent data are stored in different fields and in some embodiments they are combined in a single field. As noted above, the generation of an update relevancy value may be performed at query time, while ordering the results for a search query, where the results include an informational item for which client attention information is available. The query time updating of the relevancy value may include operation 360, or operations 340, 350 and 360.

Figure 4:
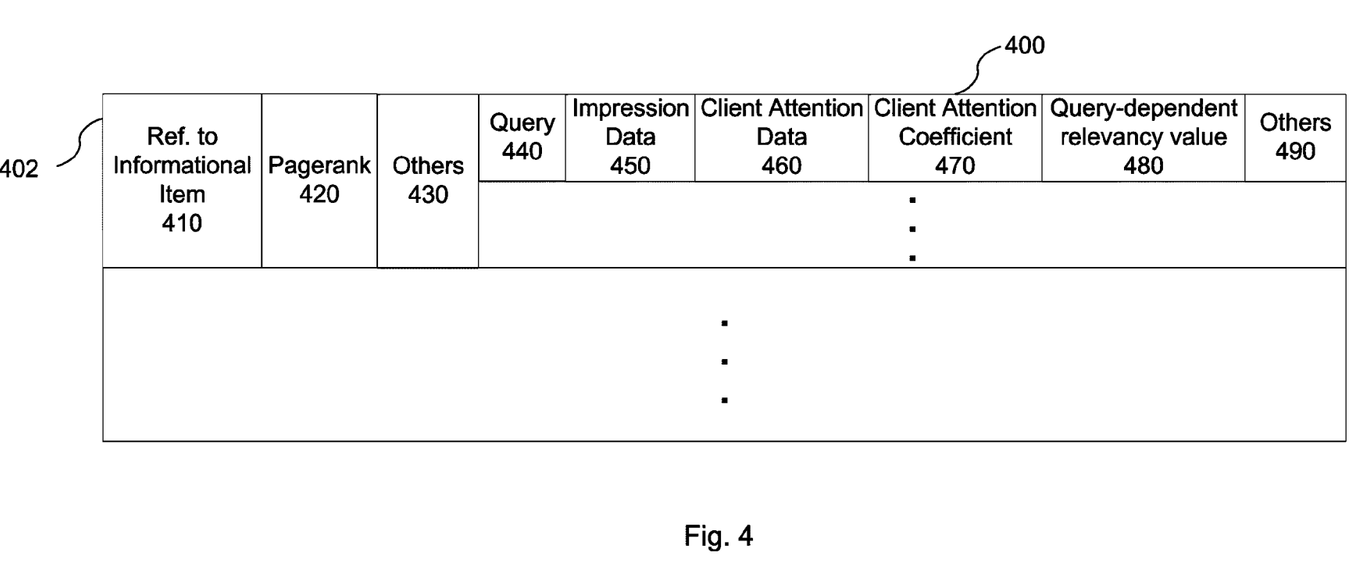
FIG. 4 depicts a data structure for storing information associated with different informational items according to some embodiments of the present invention.

The new relevancy values as well as other forms of client attention data can be stored in a data structure, each one associated with an informational item. In some embodiments, the information is associated with a particular search query. Data structure 400 of FIG. 4 depicts such a data structure for storing information associated with different informational items according to some embodiments of the present invention. The informational items may be a document, an advertising item, or a piece of information associated with a particular search query, e.g., a dictionary definition of an English word.

Data structure 400 includes one or more records 402 associated with a particular informational item. In some embodiments, each informational item (e.g., identified by a corresponding reference 410 to the information item) for which there is a record 402 has an associated PageRank 420, and other query-independent parameters 430. For example, the PageRank 420 is dependant upon the hyperlink structure associated with the informational item and it is not related to any search query. In some embodiments, an associated PageRank value is not included in record 402 when the informational item is not a type of informational item which includes a PageRank (e.g., an advertisement or dictionary definition). Additionally, the record 402 may include query-dependent attributes for one or more queries 440 that relevant to the informational item, if there is relevant impression data 450 and client attention data 460 available. In some embodiments, the query-dependent attributes include impression data 450, a set of client attention data 460 (which may include such parameters as a click-through rate, a pointer hover period and so on), a client attention coefficient 470 that is derived from the client attention data 460 and a query-dependant relevancy value 480 using, e.g., the algorithm mentioned above in connection with FIG. 3, and other parameters 490 reflecting the user's feedback or various other factors, respectively. Likewise, another query relevant to the informational item may be associated with another set of attributes that are related to user feedback with respect to that query. In some embodiments, the user feedback is not associated with a particular query, but instead is used to modify a query independent interest value associated with the informational item. In some embodiments, each record 402 may include a subset and/or a superset of the fields discussed above.

Upon receiving a new search query from a client device, the server identifies in its database one or more informational items relevant to the query and then retrieves the relevancy values of the identified informational items associated with the search query from the data structure. The identified informational items are ordered in accordance with their relevancy values and returned to the requesting client device.

Figure 5A:
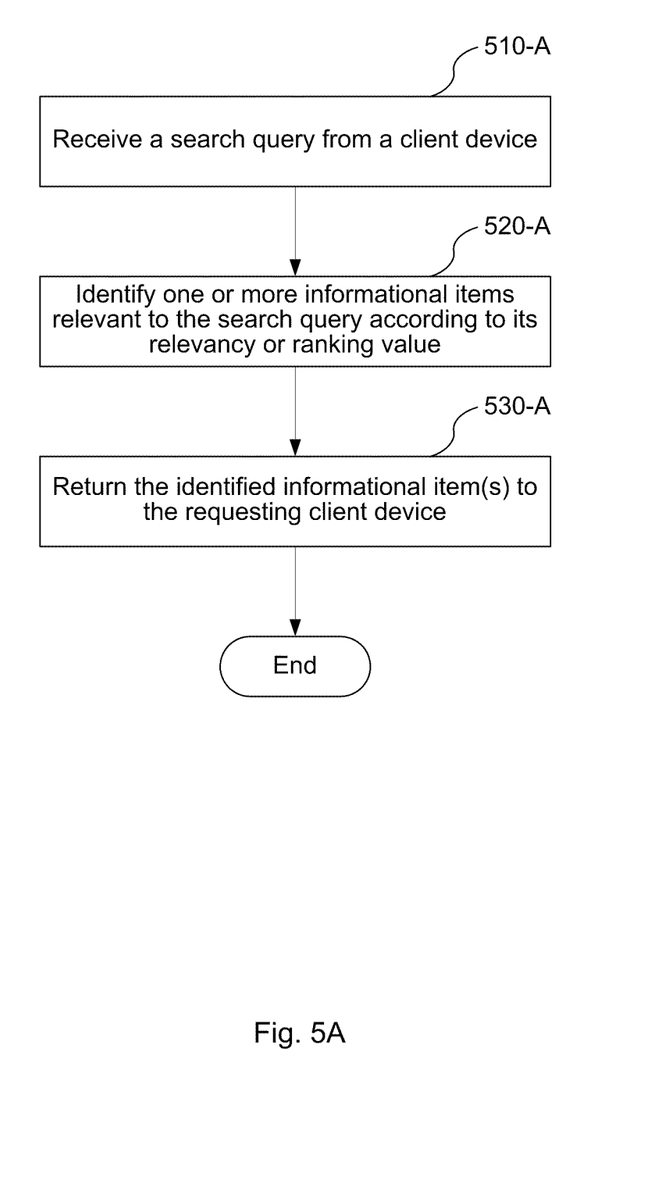
FIGS. 5A-5C are flowcharts of three specific embodiments illustrating how the server generates different types of search results in response to a search query according to some embodiments of the present invention.
Figure 5B:
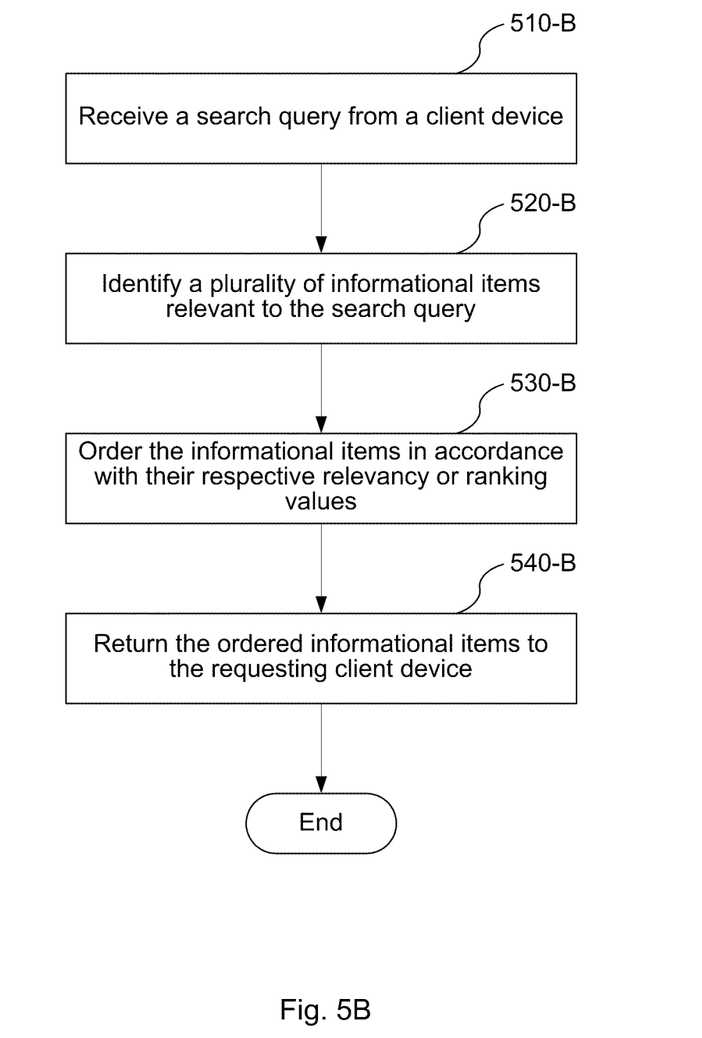
Figure 5C:
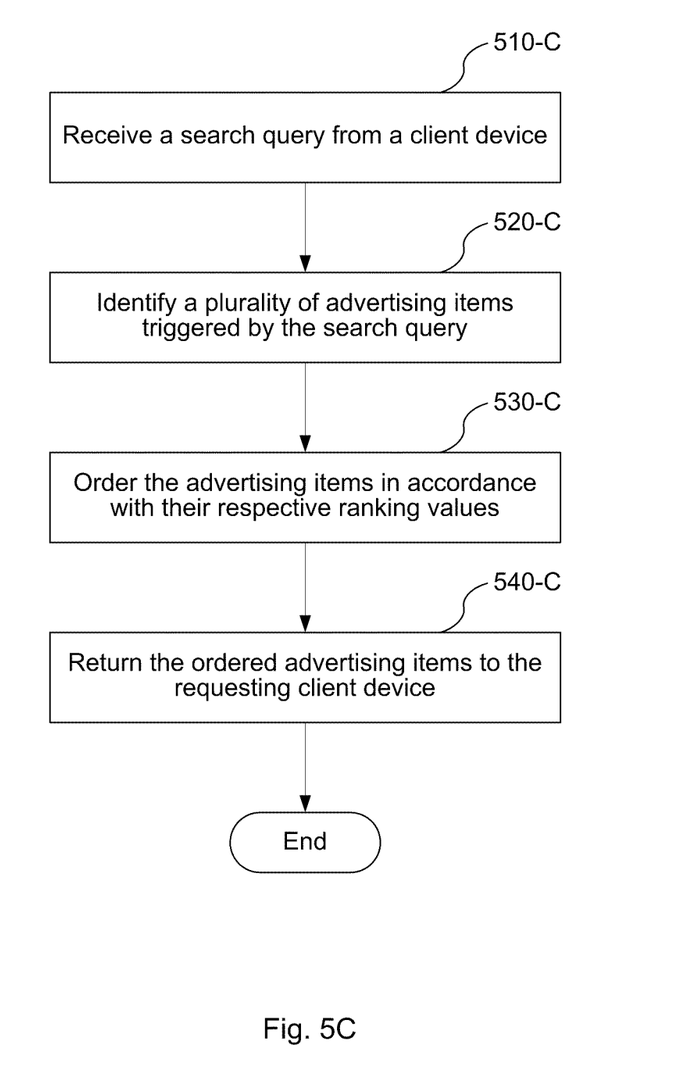

FIGS. 5A-5C are flowcharts according to some of the various embodiments illustrating how the server generates different types of information items in response to a search query. According to embodiments using the process shown in FIG. 5A, the server receives a search query from a client device (510-A), identifies one or more informational items whose associated client attention data satisfies a predefined pattern (520-A) and returns them to the requesting client device (530-A). Unlike a typical search result comprising a list of documents (with, for example, titles, snippets, link and various other information), the identified informational item is for the most part, associated with a particular source of specialized information and is considered to be closely related to the search query. These informational items may be placed at the top of a listing of search results produced by one or more other servers. In some embodiments, the information items identified at 520-A are termed "onebox results". In some embodiments, the type of informational items in the onebox results include dictionary definitions, news, stock quotes, weather and local web sites related to the search query. In the case of a returned dictionary definition for a word, for example, if the user's interest is indeed the definition, the user will probably move the pointer into the box and keep it there for a moment while reading the definition. A frequent repeat of such a pattern of pointer movement from a community of users is an indicator to the search engine that presenting that word's definition as the one-box result for that query is desirable.

For example, when a user submits a search query "agrestic", the user probably desires to know the word's definition since it is not a common word. Accordingly, the definition of the word "agrestic" is chosen to be placed in the one-box result responsive to the search query. There may be other results in the onebox area. Similarly, if a user submits a search query "goog", his intent is probably to get the instant price quote for Google's stock since "GOOG" happens to be the stock symbol for Google Incorporated. Accordingly, it is desirable for the onebox results to provide the stock quote, e.g., the current price of the stock and perhaps even a graph showing the stock's price trend. As with the dictionary definition example, if the onebox result matched the user's interest, the user would probably move the pointer into a region defined by the result and keep the pointer there while reading the information. In other words, the user's interest is demonstrated by a pointer hover period associated with the onebox result. On the other hand, when the user does not move the pointer to the box or moves the pointer away from the result this can be interpreted in at least two ways: 1) the onebox result was not of interest to the user; or 2) the user was interested, but did not move the pointer toward the onebox result. In some embodiments, this produces negative feedback regarding client attention (e.g., when the user moves the pointer away from the informational item). In some embodiments, this information is simply not utilized. In some embodiments, the onebox result includes links whose clickthroughs can be identified. A click-though indicates a positive reaction from the client which would tend to raise a relevancy value of the information item associated with the link. After receiving sufficient negative feedback or lack of positive feedback, the search engine may replace the current onebox result(s) with different informational items based on the client attention data or simply stop producing the onebox result(s). In some embodiments, the informational items presented in the onebox results are ordered in accordance with the client attention data and/or relevancy values.

Similarly, relevancy values of informational items relevant to a search query can be used to order them in a search result as shown in FIG. 5B. After receiving a search query (510-B), the search engine identifies search results comprising one or more informational items, if any, that are relevant to the search query (520-B), each informational item may include a title, a snippet and a link to another document (e.g., a web page). A snippet is generally a selected portion of text from the informational item, and preferably comprises text that includes at least one of the search terms in the search query. If an identified informational item in the search results does not have an associated URL (uniform resource locator), the informational item does not include a link. Next, the search engine orders the informational items (530-B) in accordance with their respective relevancy values associated with the search query. When an informational item in the search results has a corresponding record 402 (see FIG. 4) that includes a relevant query-dependent relevancy value 480, the query-dependent relevancy value 480 in that record 402 is used for ordering that information item with respect to the other informational items in the search results. As shown in FIG. 4, in some embodiments, the relevancy value of each informational item is based on both query-dependent client attention data and query-independent ranking information. Finally, the server returns the ordered informational items as a set of search results to the requesting client device (540-B). Subsequently, the user's new pointer activities over the search results, e.g., the pointer placements and/or movements, are monitored for next update of the items' relevancy values. In some embodiments, the user feedback regarding a particular informational item is reflected in a modification of the query independent ranking information.

FIG. 5C is a flowchart illustrating how the search engine identifies and orders a set of advertising items that are keyword-triggered by a search query according to some embodiments. Upon receiving a search query (510-C), the search engine determines whether any of the query terms are associated with advertising items hosted by the search engine. After identifying the advertising items triggered by the search query (520-C), the search engine retrieves various information which serves to help identify how to order advertisements, which can, in some instances also determine which advertisements to present to the user. For example, advertisements may be ordered by a ranking value based on a combination of click-though rate and a bid amount. In some embodiments of the invention the ranking value is also based on client feedback information as a result of pointer activity not associated with a click-through. For example, some advertisements are primarily for brand identification and a measure of interest or success of such advertisements might be indicated by a user's pointing activities associated with the advertisement. When a user is interested in an advertisement, the user may move the pointer into an area associated with the advertisement, yet not click-through. Some embodiments of the invention permit such feedback to be learned through the client attention data as described above. Finally, the search engine returns a search result as well as the advertising items that are ordered according to their ranking values (530-C) back to the requesting client device (540-C). In some embodiment, a limited number of top-ranked advertisements are returned (e.g., 3 to 5).

System Architecture

Figure 6:
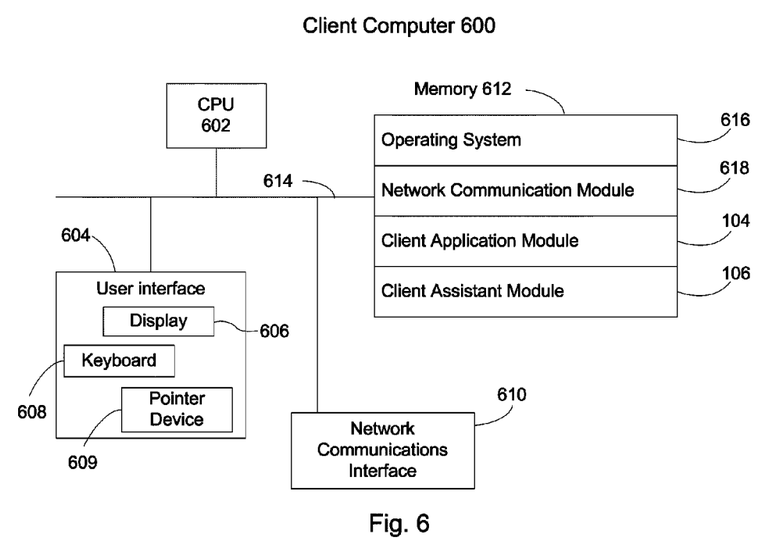
FIG. 6 is a block diagram illustrating a client computer in accordance with some embodiments of the present invention.

FIG. 6 is a block diagram illustrating a client computer 600 in accordance with some embodiments of the present invention. The client computer 600 typically includes one or more processing units (CPU's) 602, one or more network or other communications interfaces 610, memory 612, and one or more communication buses 614 for interconnecting these components. The client computer 600 optionally includes a user interface 604 that comprises a display device 606, keyboard 608 and pointer device 609 (e.g., a mouse, trackball, touch sensitive pad or display screen, or the like). The memory 612 may include high speed random access memory and may also include non-volatile memory, such as one or more magnetic disk storage devices. The memory 612 may optionally include one or more storage devices remotely located from the CPU(s) 602. In some embodiments, the memory 612 stores the following elements, modules and data structures, or a subset or superset thereof:
- an operating system 616 that includes procedures for handling various basic system services and for performing hardware dependent tasks;
- a network communication module (or instructions) 618 that is used for connecting the client computer 600 to other computers via the one or more network communications interfaces 610 (via wired or wireless connection), using the Internet, other wide area networks, local area networks, metropolitan area networks, and so on;
- a client application module 104 that is used for receiving search queries and displaying search results responsive to the search queries, e.g., a web browser; and
- a client assistant module 106 that is used for recording the pointer activities (including pointer placement and/or movement activities) of users and transferring such information to a server computer.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise rearranged in various embodiments. In some embodiments, memory 612 may store a subset of the modules and applications identified above. Furthermore, memory 206 may store additional modules, applications and data structures not described above.

Figure 7:
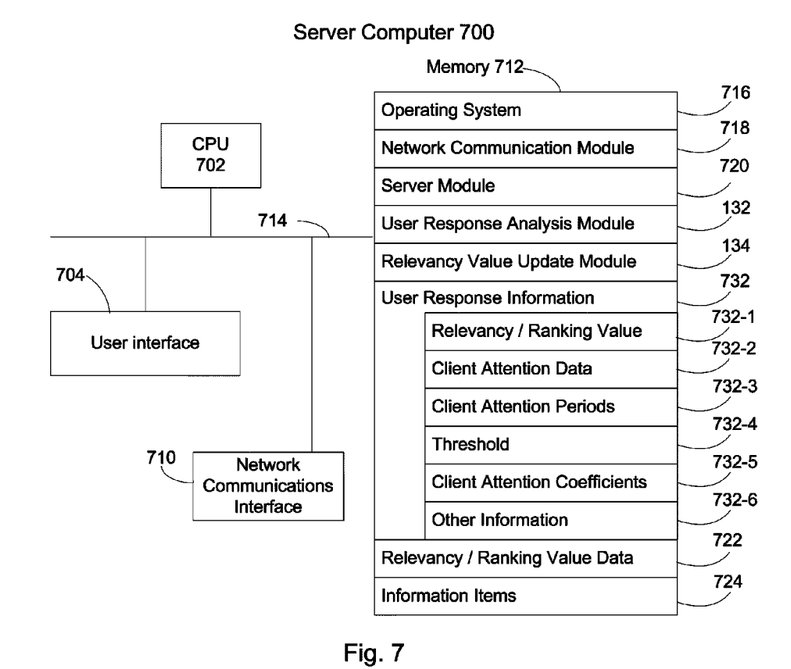
FIG. 7 is a block diagram illustrating a server computer in accordance with some embodiments of the present invention.

FIG. 7 is a block diagram illustrating a server computer 700 in accordance with some embodiments of the present invention. The server computer 700 typically includes one or more processing units (CPU's) 702, one or more network or other communications interfaces 710, memory 712, and one or more communication buses 714 for interconnecting these components. The server computer 700 may optionally include a user interface 704. Memory 712 may include high speed random access memory and may also include non-volatile memory, such as one or more magnetic disk storage devices. The memory 712 may optionally include one or more storage devices remotely located from the CPU(s) 702. Memory 712, or alternatively the non-volatile memory device(s) within memory 712, comprises a computer readable storage medium. In some embodiments, memory 712 or the computer readable storage medium of memory 712 includes the following programs, modules and data structures, or a subset or a superset thereof:
- an operating system 716 that includes procedures for handling various basic system services and for performing hardware dependent tasks;
- a network communication module (or instructions) 718 that is used for connecting the server computer 700 to other computers via the one or more network communications interfaces 710 (via wired or wireless connection), using the Internet, other wide area networks, local area networks, metropolitan area networks, and so on;
- a server module (or instructions) 720 that is used for interpreting search queries, identifying informational items that are relevant to each search query and returning search results to requesting client computers 600;
- user response analysis module (or instructions) 132, as described above;
- a relevancy value update module (or instructions) 134 that is used for adjusting an informational item's relevancy or ranking value associated with a search query based upon user feedback and/or other query-independent and/or query-dependent factors;
- user response information 732 that includes information associated with informational items and may include a subset of or superset of the information in data structure 400 including, for example, impression data 732-1, client attention data 732-2, client attention periods 732-3, a threshold value 732-4, client attention coefficients 732-5 or other information 732-6, such as various other query-dependent and/or query independent information;
- a relevancy value data structure 722 storing the relevancy values generated by the relevancy value update module 134; and
- informational items 724 as described above.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise rearranged in various embodiments. In some embodiments, memory 612 may store a subset of the modules, applications and data structures identified above. Furthermore, memory 712 may store additional modules, applications and data structures not described above.

Although FIG. 7 shows server 700 as a number of discrete items, FIG. 7 is intended more as a functional description of the various features which may be present in server 700 rather than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers in server 700 and how features are allocated among them will vary from one implementation to another, and may depend in part on the amount of data traffic that the system must handle during peak usage periods as well as during average usage periods.

Although certain elements are depicted as being in the client computer 600 or the server computer 700, certain elements may be located in whole or in part in the other, or distributed among a plurality of computers. For example, the user response information 732 could be partially located in the client computer 600. As another example, the information items 724 could reside on a plurality of computers.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method of providing search results responsive to search queries, comprising:
at a server system having one or more processors and memory storing one or more programs for execution by the one or more processors:
receiving from client devices user hover periods associated with a plurality of search results which correspond to multiple search queries, a respective user hover period comprising information about a length of time that a user hovers a user-controlled pointer over a display region occupied by a respective search result of the plurality of search results and wherein the respective hover period comprises a period of time during which the user-controlled pointer hovers over the display region occupied by the respective search result without user selection of the respective search result;
updating relevancy values of the search results at least partially in accordance with their respective user hover periods; and
in response to a search query after the update of the relevancy values, identifying a set of search results for the search query in accordance with their relevancy values, the set of search results including at least one search result whose respective relevancy value has been updated at least partially in accordance with one or more respective user hover periods.

2. The method of claim 1, wherein updating relevancy values includes:
retrieving impression data associated with the plurality of search results provided to the client devices in response to the search queries, wherein the impression data comprises data identifying how many times and in what order the search results in the plurality of search results have been provided to the client devices in response to the search queries;
receiving from at least a subset of the client devices client attention data, the client attention data including the user hover period associated with a respective search result if the hover period is greater than a threshold value; and
updating the relevancy values for at least a subset of the plurality of search results in accordance with their respective impression data and client attention data.

3. The method of claim 2, wherein the updating the relevancy values includes:
generating at least one client attention coefficient for each of the search results in the subset of the plurality of search results in accordance with the impression data and the client attention data corresponding to the search results;
combining the at least one client attention coefficient associated with each search result in the subset with at least one other query-independent metric of the search result's importance or popularity; and
generating a relevancy value for each search result in the subset of the plurality of search results in accordance with its combined client attention coefficients and the at least one other query-independent metric of the search item's importance or popularity.

4. The method of claim 1, further including providing to a respective client device of the client devices additional information concerning a respective search result of the set of search results over which the user-controlled pointer is hovering.

5. The method of claim 1, wherein a respective search result of the plurality of search results includes at least a first portion and a second portion and the hover periods with respect to the first and second portions have different weights when they are used for updating the respective search result's relevancy value.

6. The method of claim 5, wherein the first portion of the respective search result is a descriptor and the second portion of the respective search result is a snippet.

7. The method of claim 5, wherein the updating of the respective search result's relevancy value occurs only when the respective hover period is greater than a threshold value.

8. A server system for providing search results responsive to search queries, comprising:
a memory;
one or more processors; and
a program, wherein the program is stored in the memory and configured to be executed by the one or more processors, the program comprising:

instructions for receiving from client devices user hover periods associated with a plurality of search results which correspond to multiple search queries, a respective user hover period comprising information about a length of time that a user hovers a user-controlled pointer over a display region occupied by a respective search result of the plurality of search results and wherein the respective hover period comprises a period of time during which the user-controlled pointer hovers over the display region occupied by the respective search result without user selection of the respective search result;

instructions for updating relevancy values of the search results at least partially in accordance with their respective user hover periods; and instructions for responding to a search query after the update of the relevancy values by identifying a set of search results for the search query in accordance with their relevancy values, the set of search results including at least one search result whose respective relevancy value has been updated at least partially in accordance with one or more respective user hover periods.

9. The system of claim 8, wherein updating relevancy values includes:

instructions for retrieving impression data associated with the plurality of search results provided to the client devices in response to the search queries, wherein the impression data comprises data identifying how many times and in what order the search results in the plurality of search results have been provided to the client devices in response to the search queries;

instructions for receiving from at least a subset of the client devices client attention data, the client attention data including the user hover period associated with a respective search result if the hover period is greater than a threshold value; and instructions for updating the relevancy values for at least a subset of the plurality of search results in accordance with their respective impression data and client attention data.

10. The system of claim 9, wherein the updating the relevancy values includes:

instructions for generating at least one client attention coefficient for each of the search results in the subset of the plurality of search results in accordance with the impression data and the client attention data corresponding to the search results;

instructions for combining the at least one client attention coefficient associated with each search result in the subset of the plurality of search results with at least one other query-independent metric of the search result's importance or popularity; and instructions for generating a relevancy value for each search result in the subset of the plurality of search results in accordance with its combined client attention coefficients and the at least one other query-independent metric of the search item's importance or popularity.

11. The system of claim 8, further including instructions for providing to a respective client device of the client devices additional information concerning a respective search result of the set of search results over which the user-controlled pointer is hovering.

12. The system of claim 8, wherein a respective search result of the plurality of search results includes at least a first portion and a second portion and the hover periods with respect to the first and second portions have different weights when they are used for updating the respective search result's relevancy value.

13. The system of claim 12, wherein the first portion of the respective search result is a descriptor and the second portion of the respective search result is a snippet.

14. The system of claim 12, wherein the updating the respective search result's relevancy value occurs when the respective hover period is greater than a threshold value.

15. A non-transitory computer readable storage medium storing one or more programs for execution by a server system, the one or more programs comprising:

instructions for receiving at the server from client devices user hover periods associated with a plurality of search results which correspond to multiple search queries, a respective user hover period comprising information about a length of time that a user hovers a user-controlled pointer over a display region occupied by a respective search result of the plurality of search results and wherein the respective hover period comprises a period of time during which the user-controlled pointer hovers over the display region occupied by the respective search result without user selection of the respective search result;

instructions for updating relevancy values of the search results at least partially in accordance with their respective user hover periods; and instructions for responding to a search query after the update of the relevancy values by identifying a set of search results for the search query in accordance with their relevancy values, the set of search results including at least one search result whose respective relevancy value has been updated at least partially in accordance with one or more respective user hover periods.

16. The non-transitory computer readable storage medium of claim 15, wherein the instructions for updating relevancy values include:

instructions for retrieving impression data associated with the plurality of search results provided to the client devices in response to the search queries, wherein the impression data comprises data identifying how many times and in what order the search results in the plurality of search results have been provided to the client devices in response to the search queries;

instructions for receiving from at least a subset of the client devices client attention data, the client attention data including the user hover period associated with a respective search result if the hover period is greater than a threshold value; and instructions for updating the relevancy values for at least a subset of the plurality of search results in accordance with their respective impression data and client attention data.

17. The non-transitory computer readable storage medium of claim 16, wherein the instructions for updating the relevancy values include:

instructions for generating at least one client attention coefficient for each of the search results in the subset of the plurality of search results in accordance with the impression data and the client attention data corresponding to the search results;

instructions for combining the at least one client attention coefficient associated with each search result in the subset of the plurality of search results with at least one other query-independent metric of the search result's importance or popularity; and instructions for generating a relevancy value for each search result in the subset of the plurality of search results in accordance with its combined client attention coefficients and the at least one other query-independent metric of the search item's importance or popularity.

18. The non-transitory computer readable storage medium of claim 15, further including instructions for providing to a respective client device of the client devices additional information concerning a respective search result of the set of search results over which the user-controlled pointer is hovering.

19. The non-transitory computer readable storage medium of claim 15, wherein a respective search result of the plurality of search results includes at least a first portion and a second portion and the hover periods with respect to the first and second portions have different weights when they are used for updating the respective search result's relevancy value.

20. The non-transitory computer readable storage medium of claim 19, wherein the first portion of the respective search result is a descriptor and the second portion of the respective search result is a snippet.

21. The non-transitory computer readable storage medium of claim 19, wherein the instructions for updating the relevancy values include instructions for updating the respective search result's relevancy value only when the respective hover period is greater than a threshold value.

* * * * *